US012177380B2

(12) United States Patent
Haltom et al.

(10) Patent No.: US 12,177,380 B2
(45) Date of Patent: Dec. 24, 2024

(54) SYSTEMS AND METHODS FOR INDICATING AND MANAGING A VALIDATION OF A CALLER IDENTIFICATION TO PREVENT IDENTITY SPOOFING

(71) Applicant: Verizon Patent and Licensing Inc., Basking Ridge, NJ (US)

(72) Inventors: Jeffrey Haltom, Fishers, IN (US); Alejandro Lopez, South Bound Brook, NJ (US); Lulia Ann Barakat, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 109 days.

(21) Appl. No.: 17/448,232

(22) Filed: Sep. 21, 2021

(65) Prior Publication Data

US 2023/0088868 A1    Mar. 23, 2023

(51) Int. Cl.
*H04M 3/00* (2024.01)
*H04L 9/40* (2022.01)
(Continued)

(52) U.S. Cl.
CPC ........ *H04M 3/42059* (2013.01); *H04L 63/08* (2013.01); *H04L 65/1104* (2022.05); *H04L 69/22* (2013.01); *H04W 12/40* (2021.01)

(58) Field of Classification Search
CPC ............. H04M 3/42042; H04M 3/436; H04M 2201/42; H04M 7/0006; H04M 2203/253; H04M 7/0063; H04M 7/006; H04M 7/0057; H04M 1/663; H04M 1/56; H04M 3/42059; H04L 65/1069; H04L 63/14; H04L 63/1408; H04L 63/16; H04L 63/20;
(Continued)

(56) References Cited

U.S. PATENT DOCUMENTS 8,165,113 B1 *  4/2012  Peters, Jr. ........... H04L 65/1069
                                                  370/389
8,345,670 B1 *  1/2013  Xue ..................... H04L 65/1083
                                                  370/467
(Continued)

OTHER PUBLICATIONS

Peterson et al., "Authenticated Identity Management in the Session Initiation Protocol (SIP)," Internet Engineering Task Force (IETF), Standards Track, Feb. 2018, 46 Pages.
(Continued)

*Primary Examiner* — Kharye Pope

(57) ABSTRACT

In some implementations, a device may receive a SIP invite associated with a call to a first user device from a second user device. The first user device may be associated with a first network and the second user device may be associated with a second network that is separate from the first network. The SIP invite may include an identity header that indicates a carrier identifier associated with the second network. The device may authenticate the call based on a caller identification associated with the second user device and the carrier identifier. The device may send, based on authenticating the call, the SIP invite to the first user device to indicate, in
(Continued)

association with receiving the call and via a user interface, an authorized entity associated with the carrier identifier according to the SIP update.

20 Claims, 7 Drawing Sheets

(51) Int. Cl.
| | |
|---|---|
| *H04L 12/66* | (2006.01) |
| *H04L 65/1104* | (2022.01) |
| *H04L 69/22* | (2022.01) |
| *H04M 3/42* | (2006.01) |
| *H04M 5/00* | (2006.01) |
| *H04W 12/40* | (2021.01) |

(58) Field of Classification Search
CPC . H04L 63/30; H04L 65/1016; H04L 65/1076; H04L 67/104; H04L 65/1079; H04L 65/1104; H04L 65/1101; H04W 12/02; H04W 12/04; H04W 12/06; G06F 3/04842; G06F 3/0482
USPC ............... 379/114.14, 145, 207.15, 210.02; 370/352, 356
See application file for complete search history.

(56) References Cited

U.S. PATENT DOCUMENTS

| | | | |
|---|---|---|---|
| 10,785,369 B1* | 9/2020 | Dashevskiy | H04M 3/2281 |
| 10,827,338 B1* | 11/2020 | Bodapotula | H04L 65/102 |
| 10,893,414 B1* | 1/2021 | Filart | H04L 65/1069 |
| 10,979,565 B1* | 4/2021 | Piscopo, Jr. | H04W 80/10 |
| 2009/0323677 A1* | 12/2009 | Mehmood | H04L 65/1069 370/352 |
| 2020/0053136 A1* | 2/2020 | Filart | H04L 65/1096 |
| 2020/0221302 A1* | 7/2020 | Filart | H04L 65/1104 |
| 2020/0252503 A1* | 8/2020 | Li | H04L 65/1079 |
| 2020/0304546 A1* | 9/2020 | Chavez | H04L 65/1076 |
| 2020/0389552 A1* | 12/2020 | Trim | H04W 12/61 |
| 2021/0203700 A1* | 7/2021 | Asveren | H04L 65/1069 |
| 2021/0337384 A1* | 10/2021 | Synal | H04W 12/069 |
| 2022/0086276 A1* | 3/2022 | Ranalli | H04L 9/3247 |
| 2022/0182487 A1* | 6/2022 | Sharma | H04M 3/382 |

OTHER PUBLICATIONS

"Signature-based Handling of Asserted information using toKENs (SHAKEN)," ATIS-1000074.v002, Alliance for Telecommunications Industry Solutions, Feb. 2020, 17 Pages.

* cited by examiner

SYSTEMS AND METHODS FOR INDICATING AND MANAGING A VALIDATION OF A CALLER IDENTIFICATION TO PREVENT IDENTITY SPOOFING

BACKGROUND

Identity spoofing refers to an action of assuming an identity of some other entity (e.g., human or non-human), and utilizing the identity to accomplish an inappropriate goal. For example, an identity spoofing technique may generate messages that appear to come from a different entity and/or may utilize stolen or spoofed authentication credentials.

A robocall is a telephone call that utilizes a computerized auto-dialer to deliver a pre-recorded message, or to automatically establish a call with a call center operator. Robocalls have become common in connection with political campaigns, telemarketing campaigns, public service announcements, and/or the like, and people may wish to avoid receiving such unsolicited calls. Various techniques can be used to avoid unwanted robocalls, both automated (for example, through "do-not-call" lists) and manual (for example, by receiving "caller identifier" information and reviewing it prior to accepting the call). However, recently robocalls have become associated with identity spoofing techniques intended to falsify or obscure the true source of the call. These techniques have made it difficult for end users to avoid unwanted call attempts, resulting in annoyance to users, distrust of the caller information being provided with calls, and in egregious cases, frauds perpetrated on users.

DETAILED DESCRIPTION OF PREFERRED EMBODIMENTS

Figure 1A:
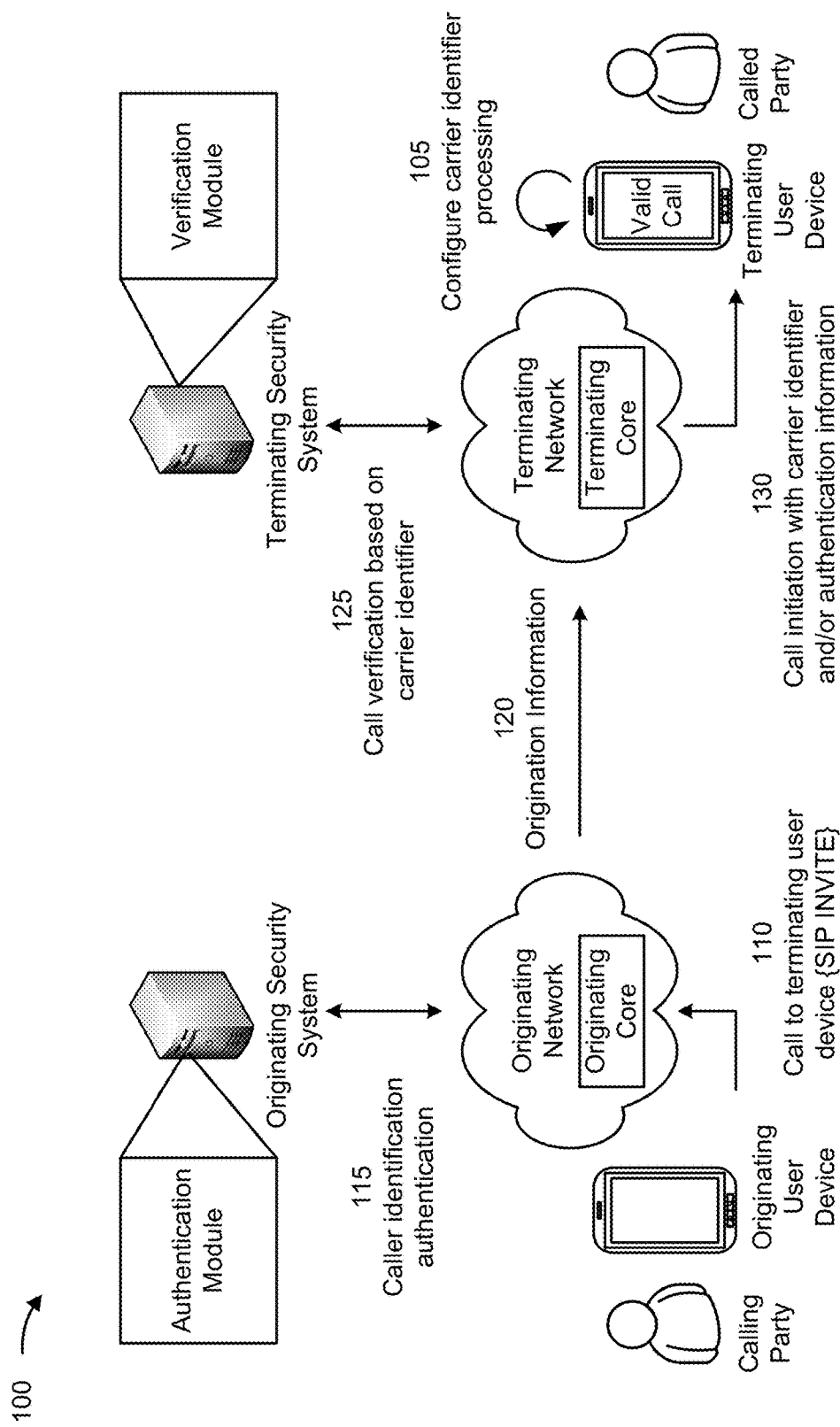
FIGS. 1A-1B are diagrams of an example associated with indicating and managing a validation of a caller identification to prevent identity spoofing.

The following detailed description of example implementations refers to the accompanying drawings. The same reference numbers in different drawings may identify the same or similar elements.

The proliferation of identity spoofing, combined with robocalling, often leads to unsuspecting consumers falling victim to scams from malicious callers, such as scams associated with malicious callers impersonating government agencies, offering fake free travel offers, offering fraudulent financial loan support, providing fake software technical support, and/or the like. Identity spoofing and robocalls also devalue real-time communication processes (e.g., due to consuming available bandwidth or computing resources that would otherwise be available to the network) and annoy customers. "Blocklists" (e.g., lists of calling party identifiers from which calls should be blocked) may be utilized with anti-robocalling tools and applications, but are easily thwarted by various and evolving identity spoofing techniques.

Some implementations described herein provide a call security system that indicates and/or manages a validation of a caller identification by a particular carrier to restore user confidence in caller identification information provided within call requests. For example, the call security system may receive call information associated with a call to a first user device from a second user device. The call security system may be associated with a terminating network that is associated with the first user device (e.g., the first user device is associated with a subscriber of the terminating network). As described herein, the call information may be received from an originating network that is associated with the second user device and different from the terminating network. The call security system may determine that authentication of the caller identification by the originating network is valid and may forward the call information to the first user device. The call security system may include a carrier identifier that is associated with an authorized entity of the originating network to permit the first user device to use the carrier identifier to verify the call and/or indicate (e.g., via a user interface) that the call was authenticated by the authorized entity (e.g., to permit a user of the first user device to gain confidence that the call from the second user device is not using an unauthorized calling identity).

As described herein, a user device (e.g., a terminating user device) may be configured to receive a call that includes a carrier identifier that is associated with an authorized entity that authenticated a caller identification of the call. For example, the user device may be configured to process (e.g., according to an update described herein) the carrier identifier from an identity header of the call. In this way, the user device may indicate via a user interface that the call (e.g., an incoming call) has been authenticated by an authorized entity associated with an originating network and/or that the authorized entity has been validated by a terminating network, thereby indicating that the call is not associated with an unauthorized calling identity.

Accordingly, the user device and/or the call security system, as described herein, may restore user confidence in answering calls and/or conserve resources that would otherwise be wasted by a user ignoring a valid call from a non-malicious caller (e.g., resources consumed by the non-malicious caller calling the user again). Furthermore, indicating that a particular call could not be verified as being authenticated by an authorized entity may conserve resources that would otherwise be wasted by the user answering a call from a malicious caller (e.g., because the user may ignore the call due to the indication that the call could not be verified as authenticated). In some implementations, the user device and/or the call security system may be configured to receive and/or process user feedback associated with a received call to permit the call security system to dynamically update information associated with an authorized entity that authenticated a call to the user device. In this way, the user device and/or the call security system may automatically learn and/or identify authorized entities that accurately (or inaccurately) authenticate calls from originating networks, thereby improving, over time, accuracy with respect to validating incoming calls from originating networks that are validated by various authorized entities.

As used herein, a "call" involves a communication session between two or more endpoints—for example, a "calling party" or "originating" user device and a "called party"

or "terminating" user device—for real-time information exchange. The real-time information supported by the communication session may encompass one or more media types (e.g., voice (audio) and/or video). A typical use case would be a voice communication session between a calling party and a called party, but implementations of a video communication session between a calling party and a called party, or an audio/video communication session between a calling party and multiple called parties, may also be similarly considered in association with the examples described herein.

Figure 1B:
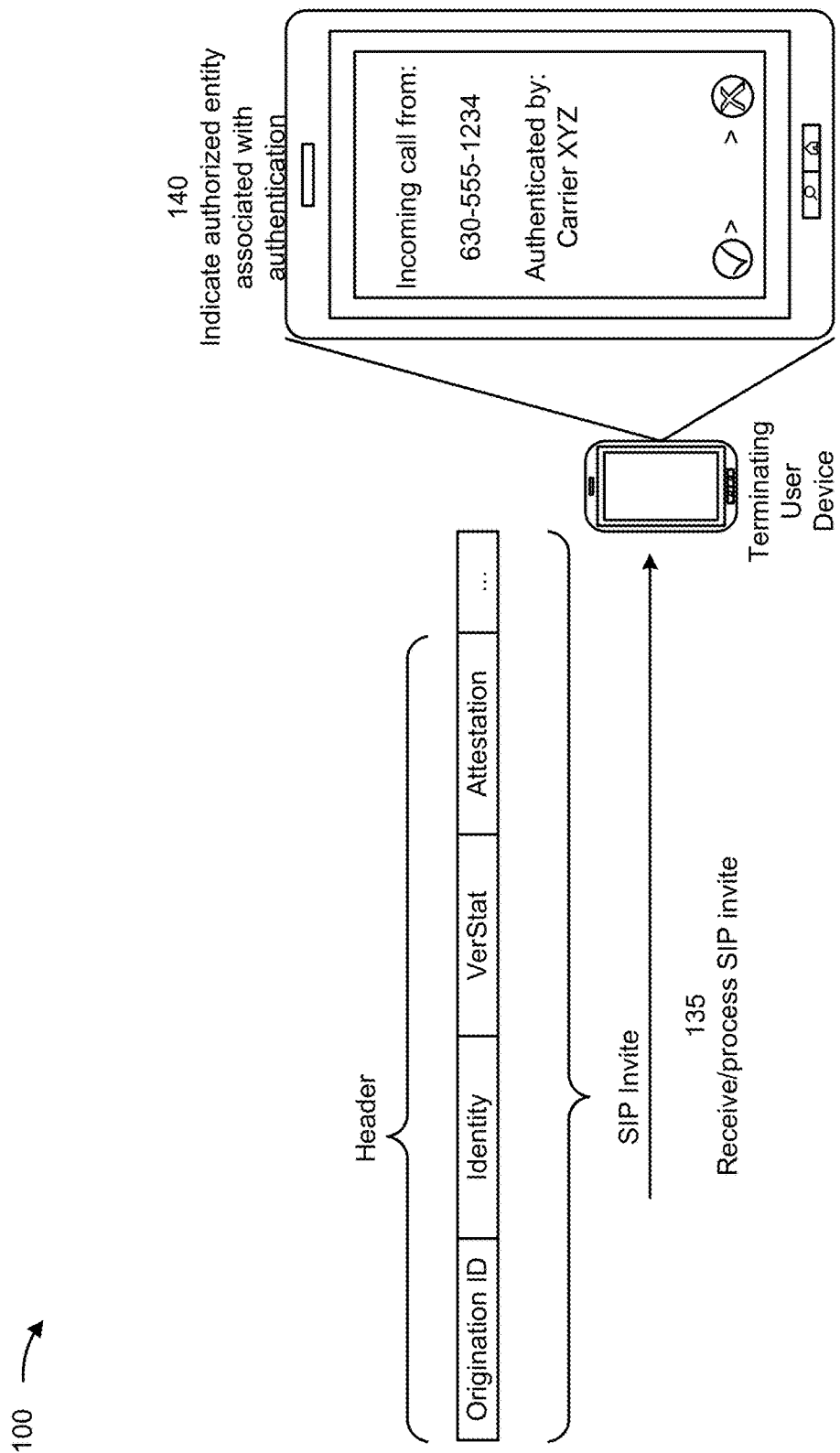

FIGS. 1A-1B are diagrams of an example implementation 100 associated with indicating and/or managing a validation of a caller identification to prevent identity spoofing. As shown in FIGS. 1A-1B, example implementation 100 includes an originating security system and a terminating security system, a terminating user device (e.g., a first user device) associated with a terminating network (e.g., a first network), and an originating user device (e.g., a second user device) associated with an originating network (e.g., a second network). The originating security system may be considered a call security system, as described herein, that is associated with the originating network, and the terminating security system may be considered a call security system, as described herein, that is associated with the terminating network. Furthermore, as shown in FIG. 1A, the originating network includes an originating core and the terminating network includes a terminating core that serve as core network devices of the originating network and the terminating network, respectively. These devices are further described below in connection with FIG. 3 and FIG. 4.

A call security system (e.g., the originating security system and/or the terminating security system of example implementation 100), as described herein, may communicate with the originating network, the terminating network, and (in some cases) a transit network that is between the originating network and the terminating network. In some implementations, the call security system, such as the originating security system of example implementation 100, may utilize a Secure Telephone Identity Revisited (STIR) framework (as described in Internet Engineering Task Force RFC 8224) to define the use of core protocols and technologies for applying digital signatures to validate an identity of a calling party during session initiation using the Session Initiation Protocol (SIP). In some implementations, the call security system may also utilize a signature-based handling of asserted information using tokens (SHAKEN) framework to define utilization of STIR and how network service providers are to interwork calls between separate networks. The call security system may utilize the STIR/SHAKEN framework to provide an anti-spoofing SIP-based system that authenticates a SIP originating call using a cryptographic signature (e.g., an identity header) that can be verified by a terminating SIP network device, such as the terminating security system of example implementation 100.

In some implementations, the call security system may utilize the STIR/SHAKEN framework to support validation of incoming calls that contain a cryptographic signature. In some implementations, the call security system may utilize the STIR/SHAKEN framework to support signing of legitimate calls originating on networks, and downstream authentication via a cryptographic signature. In some implementations, the call security system may utilize the STIR/SHAKEN framework to support transport of the cryptographic signature across trust boundaries (e.g., across different networks). As described herein, the cryptographic signature may serve as and/or be associated with a carrier identifier of an authorized entity that authenticated a call from an originating user device.

In some implementations, the call security system may assure that an identity provided in a call is accurate according to a party that has authority over the identity (e.g., a service provider), and has not been altered as the call traverses one or more networks. This is achieved by the call security system (e.g., the call security system associated with the originating network) adding a cryptographic signature to the call information using a private key. The terminating call security system may decrypt the cryptographic signature using a public key associated with the private key to verify that the call information has not been altered in transit and/or that the authorized entity (e.g., a service provider associated with the originating network) that applied the cryptographic signature is vouching for an accuracy of the call information. Such a validation may permit users and/or the terminating network to make informed decisions regarding incoming calls and may enable analytics to be more accurately applied to incoming calls (e.g., for determining whether calls may be spam, robocalls, or have spoofed identities).

In example implementation 100, the originating security system includes an authentication module that is configured to authenticate a caller identification of a call or SIP invite. The authentication module may be associated with an authorized entity associated with the originating network, such as a service provider of the originating network or an entity associated with the service provider of the originating network. The authorized entity of the originating security system is configured to authenticate a caller identification of a call (e.g., a caller identification identified in a SIP invite from the originating user device) according to the STIR/SHAKEN framework. Furthermore, as shown in FIG. 1A, the terminating security system includes a validation module that is configured to validate the authentication of the call or the SIP invite based on the authentication module being authorized to authenticate the call. Similar to the authentication module, the validation module may be associated with an authorized entity associated with the terminating network.

As shown in FIG. 1A, and by reference number 105, a service provider associated with the terminating network may configure the terminating user device for carrier identifier processing. For example, the terminating user device may include an application or service that receives call requests (e.g., SIP invites) and can process the call information in such call requests, such as identity headers described herein. The terminating user device may be configured, to process the identity header and/or utilize a carrier identifier included within the identity header. For example, the terminating user device may configure a user interface (e.g., a display and/or a graphical user interface associated with the terminating user device receiving calls) of the terminating user device to indicate carrier identification information associated with incoming calls. The terminating user device may configure the user interface to indicate the carrier identifier in association with an indication that the caller identification is associated with the originating user device. In some implementations, the indication may specify that an authorized entity, that is identified by the carrier identifier and associated with the originating network, authenticated the caller identification.

Additionally, or alternatively, the terminating user device may maintain and/or store information associated with a carrier identifier (e.g., call information) to permit the terminating user device to provide (e.g., to the terminating security system) and/or receive (e.g., from the called party or user of the user device) feedback associated with an authorized entity that is identified by the carrier identifier.

Accordingly, as described elsewhere herein, if the terminating network (e.g., via the terminating core and/or the terminating security system) provides or forwards a carrier identifier, within a SIP invite of an incoming call, to the terminating user device, the terminating user device may indicate, via a user interface, that an authorized entity (e.g., a service provider identified by the carrier identifier) authenticated the caller identification of an incoming call.

In some implementations, the terminating user device may not initially be configured to process an identity header of a SIP invite (e.g., because SIP invites associated with other communication protocols typically do not include an identity header). In such cases, the terminating network (or a system associated with the terminating network or terminating user device) may provide an update to the terminating user device, which may be configured to permit the terminating user device, in association with receiving calls, to process identity headers of corresponding SIP invites. The terminating user device may install the update according to any suitable technique. Installation of the update on the terminating user device enables the terminating user device to perform one or more actions described herein. For example, the terminating user device may process the update to identify authentication information and/or a carrier identifier associated with the originating network (e.g., a carrier identifier associated with an authorized entity of the originating network), as described herein.

As further shown in FIG. 1A, and by reference number 110, a calling party of the originating user device may cause the originating user device to generate a call request to the terminating user device. In some implementations, the call may include a SIP INVITE message that includes call information, such as a calling party identity indicating information associated with the calling party, the originating user device, and/or the like. In some implementations, the calling party identity may include a uniform resource identifier (URI), provided in a source ("from") header field of the SIP INVITE (e.g., sip: 12155551212@ims.com), that identifies a telephony number (e.g., an E.164 number) associated with the originating user device (e.g., a North American Numbering Plan number). As further shown in FIG. 1A, the originating user device may provide the SIP INVITE with the call information to the originating network.

As further shown in FIG. 1A, and by reference number 115, the originating network provides the call information to an originating security system associated with the service provider that is providing the originating network (the "originating service provider"). The originating security system performs a caller identification authentication based on the call information. The originating security system may determine whether the calling party identity (e.g., from the SIP invite) of the call can be verified based on information associated with calling party identifier known to the originating service provider. For example, if the originating security system can verify the calling party identity by correlating the provided call information with information known to the originating service provider to be associated with the presented calling party identity (e.g., calling party legitimately subscribed to the originating service provider, received using a known ingress path—source IP address, ingress port number, layer 2 source address, source domain—or other indications of authenticity), the originating security system may authenticate the caller identification and provide origination information to be included in the SIP invite.

In some implementations, the origination information may include a cryptographic signature. For example, the originating security system may generate the cryptographic signature using a private key that is associated with the originating security system. The private key may be mapped to and/or associated with a public key that is available to the terminating security system. The cryptographic signature may be over some or all of the call information in the SIP Invite message, as may be agreed upon by the implementation of the STIR/SHAKEN framework. In some implementations, the cryptographic signature is over a portion of the origination information (e.g., the calling party identifier, the called party identifier, an attestation code.).

In some implementations, the origination information is a JSON Web Token that is provided in an Identity field of a SIP header. The JSON web token includes an encrypted header portion, an encrypted payload portion, a signature portion, and a parameters portion. The parameters portion provides a location of the public key associated with the private key used to generate the encrypted portions of the JSON web token and the signature. The encrypted header portion includes information on the encryption process (e.g., algorithm, certification, process type). The encrypted payload portion includes attestation information, such as a code indicating whether the calling party identity was authenticated and, in some implementations, a level of authentication. In some implementations the attestation information includes the calling party identifier. In some implementations, the attestation information may also include the called party identifier.

In this way, the originating security system may authenticate the caller identification and/or provide origination information indicating that the calling party identity has been authenticated by the originating security system associated with the originating service provider, and/or provide cryptographic proof that the authentication was performed by the originating service provider (and that the information was not modified in transit).

As further shown in FIG. 1A, and by reference number 120, the originating network may provide the origination information to the terminating network (e.g., to the terminating security system). Correspondingly, the terminating network (e.g., the terminating core and/or the terminating security system) may receive the origination information.

The origination information may be included within call information from the originating network. In some implementations, the origination information may be included within one or more fields of a header (e.g., an identity header) of a SIP invite to the terminating network. Accordingly, the SIP invite may include a header that includes one or more fields of origination information associated with the originating network. In some implementations, the origination information may include information that indicates or is associated with a carrier identifier that enables the terminating network and/or the terminating user device to obtain a carrier identifier associated with the originating network and/or an authentication entity associated with the originating network.

In this way, the terminating network and/or the terminating security system may receive call information and/or a SIP invite that is associated with a call and that includes origination information associated with the originating network. Accordingly, the terminating network may receive call information that specifies an authorized entity (e.g., a service provider, an entity operating on behalf of the service provider) that is responsible for indicating whether the caller identification for a call is valid or not valid.

As further shown in FIG. 1A, and by reference number 125, the terminating network (e.g., via the terminating core) may provide the call information to the terminating security system to analyze the call information, authenticate the caller identification, and/or verify the origination information provided with the call information. The terminating security system may verify an authentication of the call based on a caller identification associated with the originating user device and based on origination information. For example, the terminating security system may parse the origination information to determine a carrier identifier for the originating service provider.

In some implementations, the origination information may include a cryptographic signature. In such a case, to determine the carrier identifier, the terminating security system may use a public key that is associated with a private key used to generate the cryptographic signature associated with the origination information. For example, the origination information may identify aa location of the public key (e.g., using a uniform resource identifier (URI) or other type of link). In such a case, based on the location being verified as accessible or trusted (e.g., based on being identified and/or stored in a certificate repository associated with the terminating network and/or terminating security system), the terminating security system may obtain the public key. Using the obtained public key, the terminating security system may obtain metadata that is associated with the public key (e.g., a carrier ID, such as a name, subject identifier, an organization identifier, or other type of identifier) and that may indicate and/or be used to determine the carrier identifier.

In some implementations, the terminating security system, using the public key and/or based on a decryption of the cryptographic signature and/or the carrier identifier, may verify that the authorized entity is associated with the originating network and that the authorized entity authenticated the caller identification of the originating user device.

In some implementations, the terminating security system may add authentication information for the call information to generate an authenticated call (e.g., the call tagged with the authentication information). In such implementations, the authentication information may indicate whether the calling party identity is verified (e.g., not a spoofed identity) and/or whether the calling party identity can be trusted. The authentication information may include the carrier identifier that is associated with the service provider of the originating network. The authentication information may indicate whether the authorized entity (e.g., the service provider associated with the originating network) identified by the carrier identifier authenticated the caller identification associated with the call. The authentication information may replace the origination information. More specifically, the origination information may be removed from the call information (e.g., a SIP invite) and the authentication information may be inserted into the call information. In some implementations, both the authentication information and the origination information may be included in the call information.

Additionally, or alternatively, the authentication information may include a verification status (e.g., verstat), an attestation indicator (e.g., P-attestation-indicator), an origination identity (e.g., P-origination-ID), and/or the like. The verification status may indicate that the calling party identity (e.g., the telephony number of the originating user device) passed validation and authentication (e.g., TN-validation-passed), that the calling party identity failed validation and authentication (e.g., TN-validation-failed), that no validation or authentication of the calling party identity was performed (e.g., No-TN-validation), and/or the like. The attestation indicator may indicate that the service provider of the originating network is responsible for the origination of the call onto the originating network, has a direct authenticated relationship with the calling party and can identify the calling party, has established a verified association with the telephone number used for the call, and/or the like. If one or more of the previous conditions are not satisfied, the attestation indicator may indicate that the call is partially attested or not attested. The origination identity may provide a unique identity (e.g., a universal unique identity (UUID)) for the calling party, the call, the originating user device, and/or the like.

Accordingly, the authentication information may include a verification status indicating that the caller identification is verified, an attestation header indicating that the caller identification is valid, and/or an origination identifier indicating origination information associated with the call. Furthermore, the authentication information may be indicative of the originating network authenticating the call and the terminating network verifying the call.

In some implementations, the terminating security system may indicate that a particular call could not be verified as being authenticated by an authorized entity. For example, if the carrier identity and/or a cryptographic signature associated with the carrier identity cannot be verified, the terminating security system may provide authentication information that indicates that an authorized entity that authenticated the call could not be verified. Such an indication may conserve resources that would otherwise be wasted by the user answering a call from a malicious caller (e.g., because the user may ignore the call due to the indication that the call could not be verified as authenticated).

As further shown in FIG. 1A, and by reference number 130, the terminating network (e.g., via the terminating core) sends a call initiation with the call information to the terminating user device. In some implementations, the call initiation may correspond to an authenticated call and/or a SIP invite that includes the authentication information within a SIP header. In some implementations, the terminating network may forward the SIP invite received from the originating network to the terminating user device without authentication information and with the origination information from the originating network. In such implementations, the verification described above may be done in parallel with call initiation, and authentication information may be provided to the terminating user device while call initiation is proceeding (for example, in a subsequent SIP message).

As shown in FIG. 1B, and by reference number 135, the terminating user device receives and/or processes the SIP invite. The terminating user device may receive the SIP invite from the terminating network based on the originating network authenticating the caller identification of the originating user device.

As shown in FIG. 1B, an example SIP invite header may include one or more header fields. As shown, the SIP invite header may include authentication information, including an origination identifier (Origination ID), a verification status (Verstat), and an attestation indicator (Attestation). As described herein, the SIP header may include an identity header field (Identity) that may include the origination information. For example, the identity header field may include the JSON Web Token described above.

In some implementations, the identity header may include a carrier identifier. Additionally, or alternatively, the carrier identifier may be stored in its own header field (e.g., "Carrier ID" field of the SIP invite header) or may be stored in another header field (e.g., Identity, Origination Id, Verstat). In this way, the SIP invite header may include information that indicates the carrier ID and/or enables the terminating user device to obtain the carrier ID in association with receiving the SIP invite. The terminating user device may process the SIP invite according to the SIP update described elsewhere herein.

As further shown in FIG. 1B, and by reference number 140, the terminating user device indicates an authorized entity associated with authentication of the call. For example, as shown, the terminating user device may indicate, in association with receiving a call associated with the SIP invite, that the caller identification of the originating user device was authenticated by a service provider (Carrier XYZ) that is associated with the originating network. More specifically, the terminating user device may identify and/or extract the carrier ID from the SIP invite header (e.g., from the identity header or other field of the SIP invite header). Additionally, or alternatively, the terminating user device may perform one or more operations described above (e.g., that are performed by the terminating security system) to verify the origination information and/or obtain the carrier ID via the origination information (e.g., using a cryptographic signature and/or public key at a location identified by a JSON web token in the SIP invite).

In this way, the called party may have more (or less) confidence that the calling party is in fact associated with the caller identification that is being displayed by the user device. For example, if the carrier name displayed with the caller identification is a carrier the called party does not trust, the called party can assume the caller identification is likely to be spoofed and ignore the call. If the carrier name displayed is a carrier the called party does trust, the called party can assume the displayed caller identification is accurate, and may choose to answer the call with the terminating user device or perform other processing actions (e.g., blocking, forwarding, etc.).

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
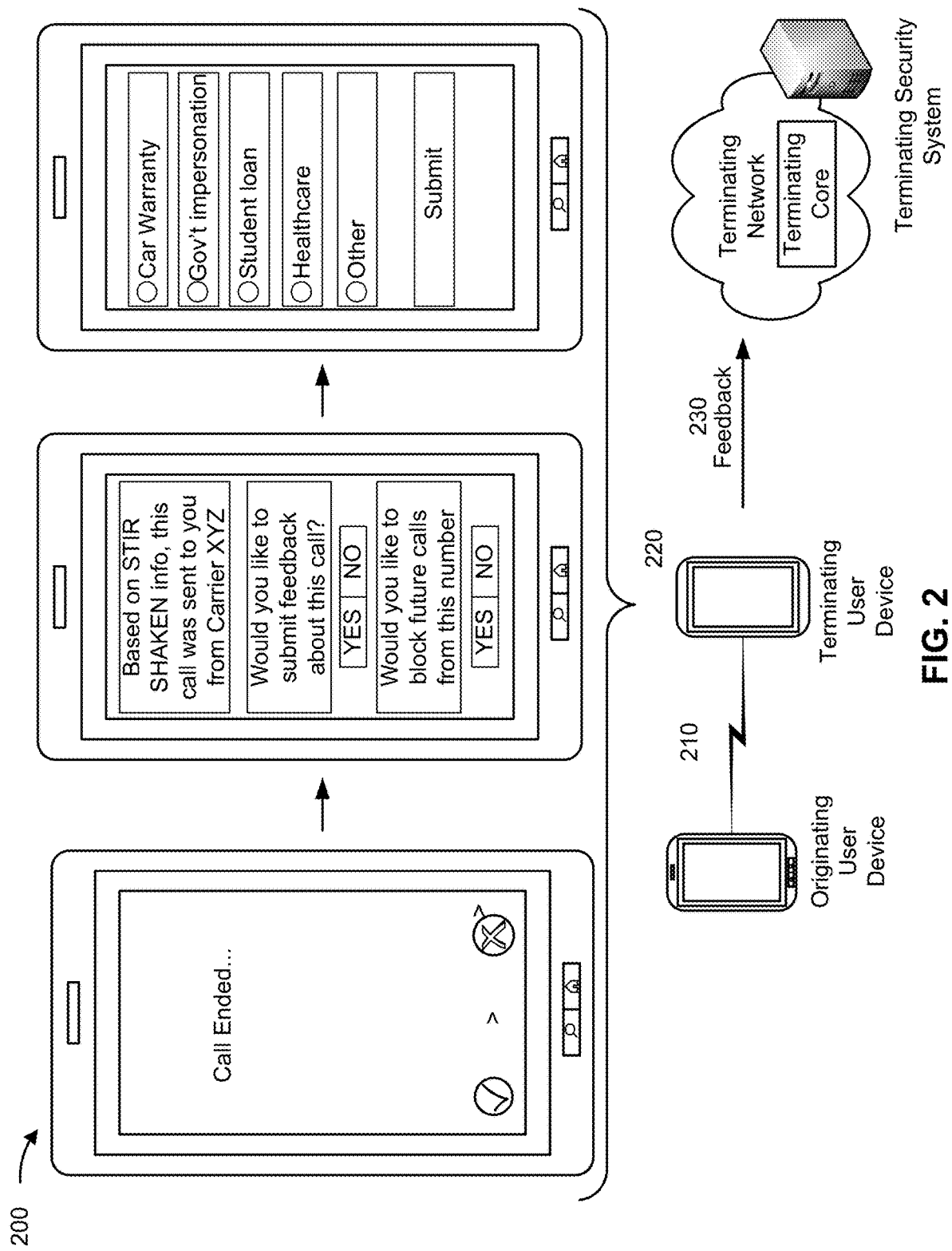
FIG. 2 is a diagram associated with an example implementation described herein.

FIG. 2 is a diagram of an example implementation 200 associated with indicating and/or managing a validation of a caller identification to prevent identity spoofing, as described herein. As shown in FIG. 2, example implementation 200 includes an originating device, a terminating device, and a terminating network that includes a terminating core and that is associated with a terminating security system.

As shown in FIG. 2, and by reference number 210, a call between the originating user device and the terminating user device is being established and/or is ongoing. As further shown in FIG. 2, and by reference number 220, a user interface of the terminating user device may indicate a carrier ID ("Carrier XYZ") associated with the call.

In some implementations, the terminating user device may be configured to monitor a status of a call. For example, the terminating user device may monitor the status of the call to detect when the call has been established, to determine a carrier ID associated with the call, and/or to detect whether a call has ended or whether a call session has been terminated by the called party. Additionally, or alternatively, the terminating user device may monitor the status of the call via an application of the terminating user device (e.g., an application associated with the terminating network and/or a service provider associated with the terminating network). In this way, the terminating user device may monitor the call to identify and/or indicate a carrier ID associated with the call.

In some implementations, the terminating user device may request feedback associated with the call. The terminating user device may request the feedback from a user (or called party) of the terminating user device based on detecting that the call with the originating user device ended. As shown, the terminating user device may be configured (e.g., according to the SIP invite) to prompt the user to provide the feedback via a user interface of the terminating user device. The user invite and/or requests for feedback may be associated with and/or configured in association with receiving the SIP invite and/or determining a carrier ID, as described herein, that is associated with the call.

As shown, the user, via the user interface, may indicate whether the user wishes to report the call as spoofed, provide feedback, and/or indicate whether the user would like to block calls associated with the caller identification. The feedback may include the user's response to block future calls associated with the caller identification. Additionally, or alternatively, as shown, the feedback may indicate whether the call was associated with a certain type of malicious or unwanted actor.

As further shown in FIG. 2, and by reference number 230, the terminating user device may send the feedback to the terminating network. For example, the terminating user device may send the feedback to the terminating security system of the terminating network to permit the terminating security system to track authentications associated with certain carrier identifiers (and/or corresponding authorized entities associated with the carrier identifiers). For example, if a user chooses to block the call, the feedback may be indicative of the caller identification being accurately or inaccurately authenticated and/or verified. More specifically, if a user blocks a caller identification associated with a call that was indicated as authenticated by an originating network, the terminating security system may infer that the originating network improperly authenticated the caller identification, or that legitimate calling identities are being used by bad actors. On the other hand, if a user blocks a caller identification associated with a call that was not indicated as authenticated (or indicated as invalid) by an originating network, the terminating security system may infer that the originating network properly indicated that the caller identification was invalid, or not improperly authenticating calls. In this way, the terminating security system may track whether an authorized entity, in association with authentications of caller identifications, is accurately or inaccurately authenticating caller identifications (e.g., to determine a confidence in the authorized entities ability to authenticate caller identifications).

Additionally, or alternatively, the terminating security system may track which types of malicious callers are associated with calls that are being blocked by called parties to permit the terminating security system to identify that a particular authorized entity is inaccurately authenticating calls associated with a particular type of malicious caller. The terminating security system may track and/or monitor other information (such as a frequency distribution of malicious calls) based on the types of malicious calls.

In this way, the terminating user device may provide feedback associated with a call to a terminating network (e.g., a terminating network that provided a SIP invite to the terminating user device for a call) to permit the terminating security system to track and/or maintain information associated with the call.

As indicated above, FIG. 2 is provided as an example. Other examples may differ from what is described with regard to FIG. 2.

Figure 3:
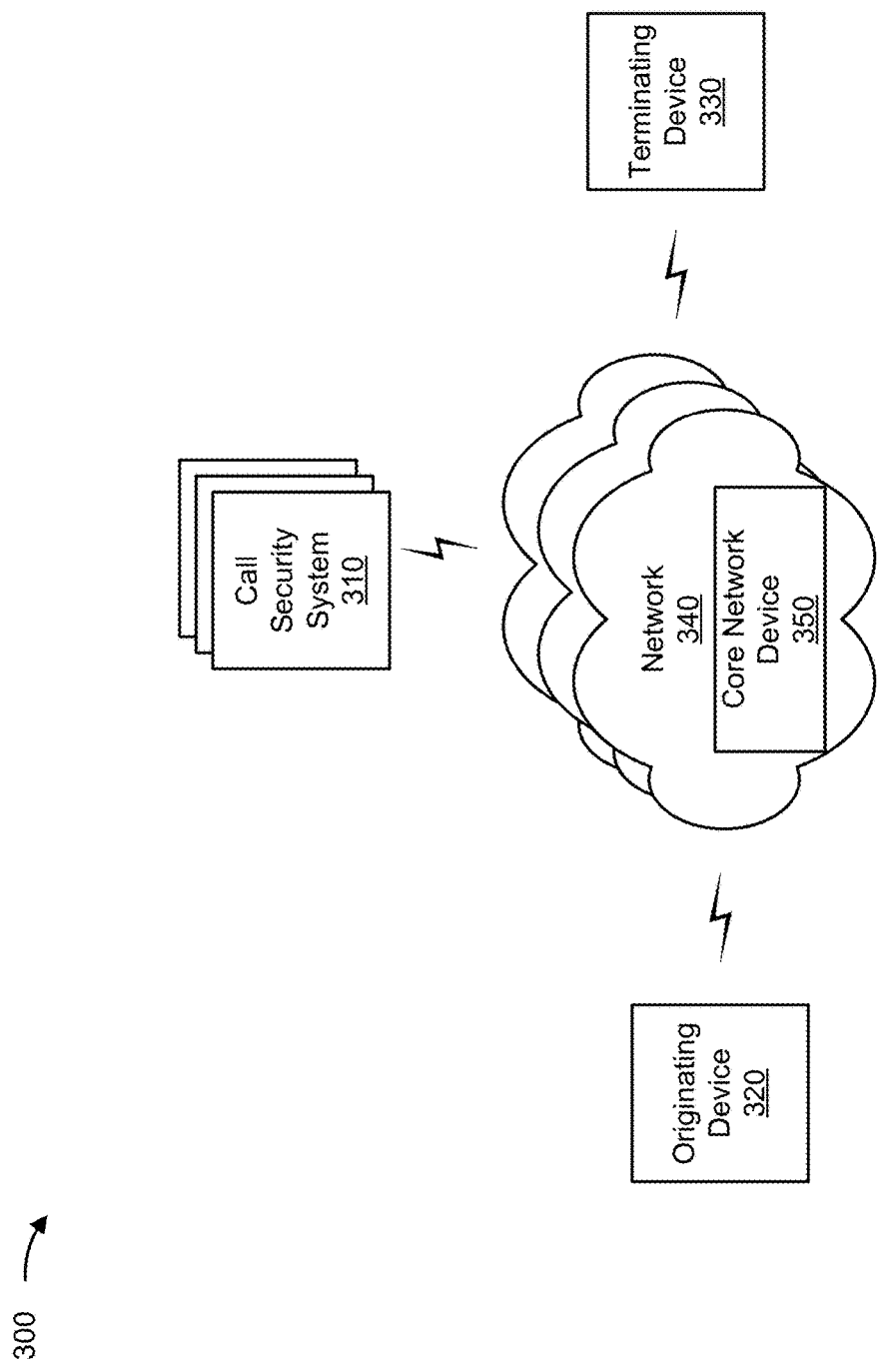
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more call security systems 310 (e.g., an originating security system and/or a terminating security system described elsewhere herein), an originating user device 320, a terminating user device 330, and one or more networks 340 with a core network device 350. In some implementations, one of the call security systems 310 may be associated with one of the networks 340. In such a case, the call security system 310 may authenticate and/or validate calls associated with the network 340 (e.g., calls originating from or terminating at the network 340), as described herein. Devices of environment 300 may interconnect via wired connections, wireless connections, or a combination of wired and wireless connections.

The call security system 310 includes one or more devices capable of receiving, generating, storing, processing, providing, and/or routing information associated with indicating and managing a validation of a caller identification to prevent identity spoofing, as described elsewhere herein. The call security system 310 may include a communication device and/or a computing device. For example, the call security system 310 may include a server, such as an authentication server, a validation server, an application server, a client server, a web server, a database server, a host server, a proxy server, a virtual server (e.g., executing on computing hardware), or a server in a cloud computing system. In some implementations, the call security system 310 includes computing hardware used in a cloud computing environment.

The originating user device 320 includes one or more devices capable of receiving, generating, storing, processing, and/or providing information associated with initiating a call (e.g., sending a SIP invite) with the terminating user device 330, as described elsewhere herein. The originating user device 320 may include a communication device and/or a computing device. For example, the originating user device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The terminating user device 330 includes one or more devices capable of receiving, generating, storing, processing, and/or providing information associated with receiving a call (e.g., receiving a SIP invite) from the originating user device 320, as described elsewhere herein. The terminating user device 330 may include a communication device and/or a computing device. For example, the terminating user device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 340 includes one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The core network device 350 includes one or more devices capable of receiving, processing, storing, routing, and/or providing traffic (e.g., a packet and/or other information or metadata) in a manner described herein. For example, the core network device 350 may include a router, such as a label switching router (LSR), a label edge router (LER), an ingress router, an egress router, a provider router (e.g., a provider edge router or a provider core router), a virtual router, or another type of router. Additionally, or alternatively, the core network device 350 may include a gateway, a switch, a firewall, a hub, a bridge, a reverse proxy, a server (e.g., a proxy server, a cloud server, or a data center server), a load balancer, and/or a similar device. In some implementations, the core network device 350 may be a physical device implemented within a housing, such as a chassis. In some implementations, the core network device 350 may be a virtual device implemented by one or more computing devices of a cloud computing environment or a data center. In some implementations, a group of core network devices 350 may be a group of data center nodes that are used to route traffic flow through the network 340.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
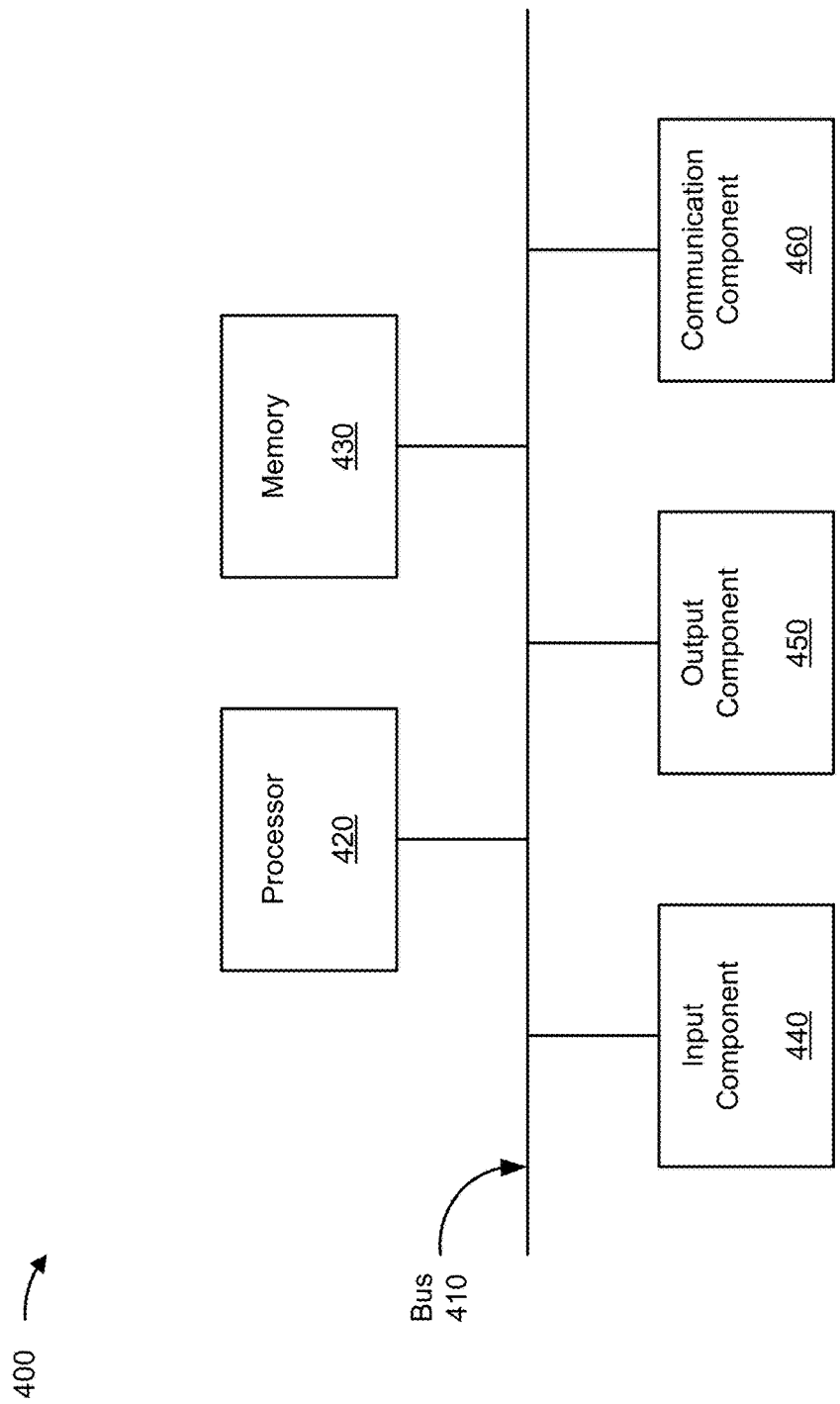
FIG. 4 is a diagram of example components of one or more devices of FIG. 3.

FIG. 4 is a diagram of example components of a device 400, which may correspond to the call security system 310, the originating user device 320, the terminating user device 330. In some implementations, the call security system 310, the originating user device 320, and/or the terminating user device 330 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
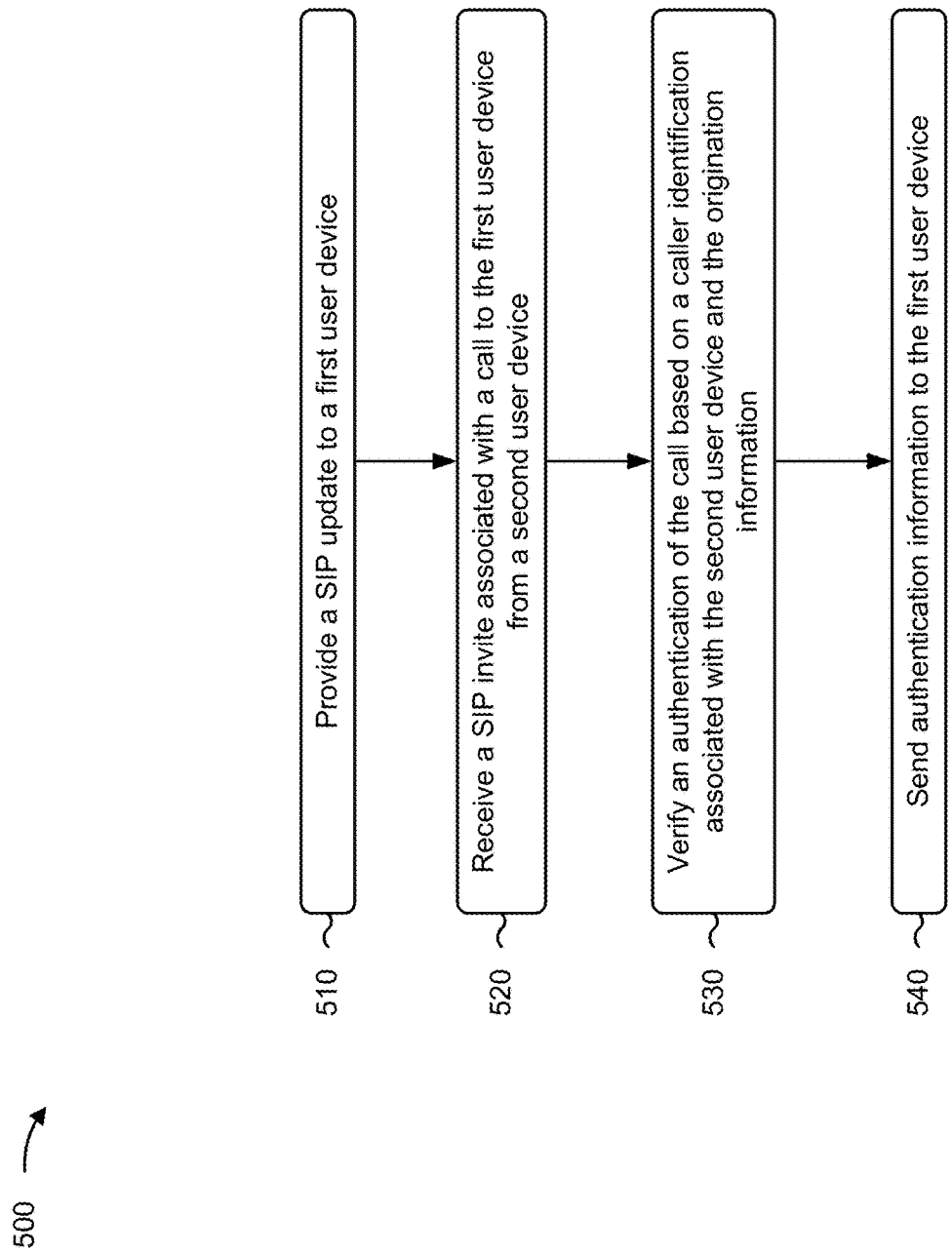
FIGS. 5 and 6 are flowcharts of example processes relating to indicating and managing a validation of a caller identification to prevent identity spoofing.

FIG. 5 is a flowchart of an example process 500 associated with indicating and/or managing a validation of a caller identification to prevent identity spoofing. In some implementations, one or more process blocks of FIG. 5 may be performed by a call security system (e.g., the call security system 310). In some implementations, one or more process blocks of FIG. 5 may be performed by another device or a group of devices separate from or including the call security system, such as an originating user device (e.g., the originating user device 320) or a terminating user device (e.g., the terminating user device 330). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include providing a SIP update to a first user device (block 510). For example, the call security system may provide a SIP update to a first user device, as described above. In some implementations, the SIP update is configured to permit the first user device, in association with receiving calls, to process identity headers of corresponding SIP invites.

As further shown in FIG. 5, process 500 may include receiving a SIP invite associated with a call to the first user device from a second user device (block 520). For example, the call security system may receive a SIP invite associated with a call to the first user device from a second user device, as described above. In some implementations, the first user device is associated with a first network and the second user device is associated with a second network that is separate from the first network.

The SIP invite may include an identity header that includes origination information associated with the second network. In some implementations, the origination information is generated based on the second network authenticating the caller identification of the second user device. In some implementations, the origination information includes a cryptographic signature generated from a private key from a private/public key pair.

As further shown in FIG. 5, process 500 may include verifying an authentication of the call based on a caller identification associated with the second user device and the origination information (block 530). For example, the call security system may verify the authentication of the call based on decryption of the cryptographic signature using the public key of the private/public key pair and comparison to a caller identification associated with the second user device, as described above. Authentication information may be generated reflecting the verification of the origination information.

In some implementations, the public key is mapped to a carrier identifier (e.g., an entity name). When the origination information is verified using the public key, the carrier identifier associated with the public key may be included in the authentication information.

As further shown in FIG. 5, process 500 may include sending authentication information the first user device (block 540). For example, the call security system may include the authentication information in the SIP Invite and send the SIP invite to the first user device. The authentication information may include a carrier identifier to indicate, in association with receiving the call and via a user interface, an authorized entity associated with the carrier identifier, as described above.

In some implementations, the SIP invite is configured to cause the first user device to request the carrier identifier based on the SIP invite specifying that the authorized entity authenticated the caller identification and that the call is valid. In some implementations, sending the SIP invite comprises forwarding the SIP invite to the first user device (e.g., without the carrier identifier), and providing the carrier identifier in a later message.

In some implementations, the authentication information includes a verification status indicating that the caller identification is verified, an attestation header indicating that the caller identification is valid, and/or an origination identifier indicating origination information associated with the second user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
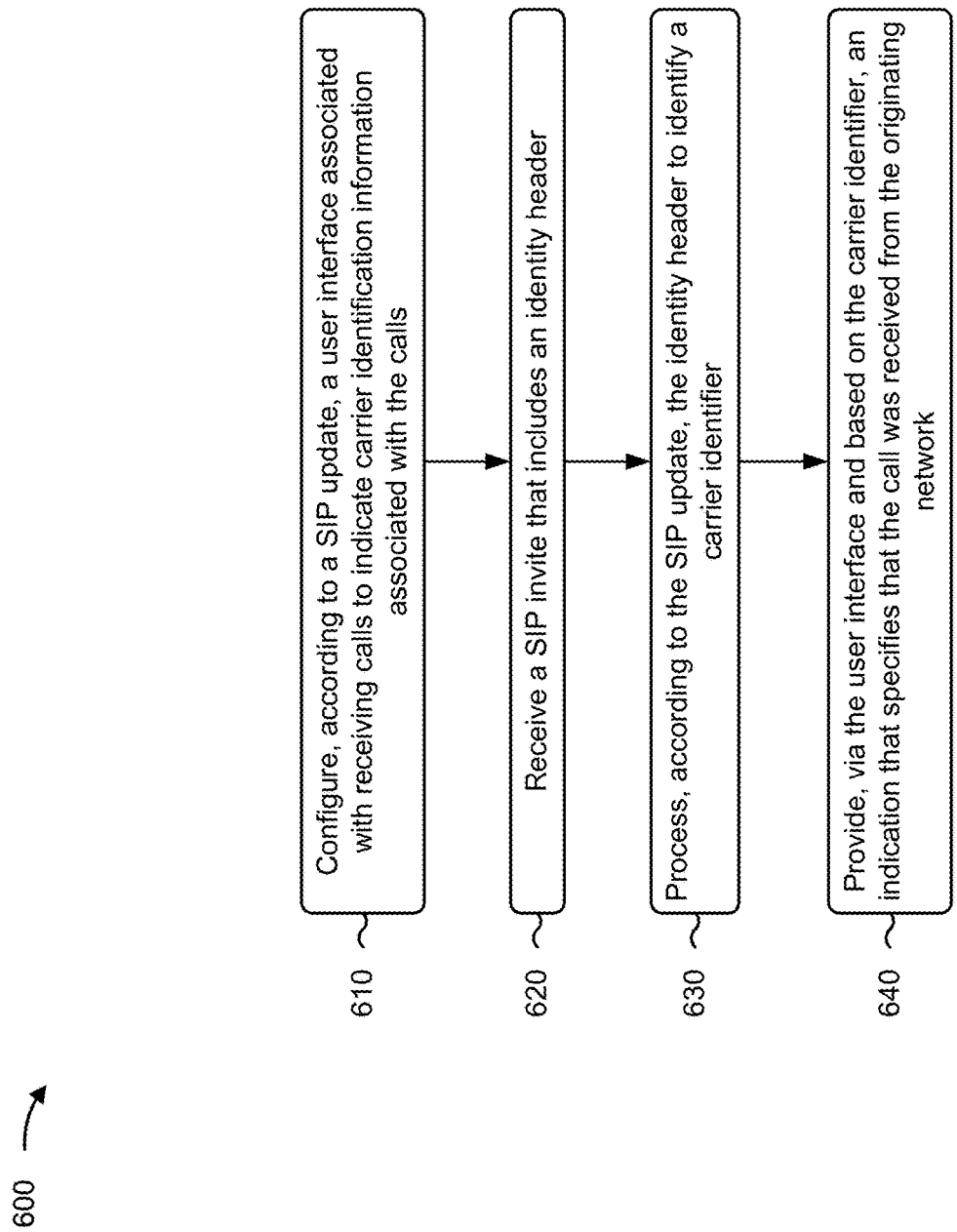

FIG. 6 is a flowchart of an example process 600 associated with indicating and/or managing a validation of a caller identification to prevent identity spoofing. In some implementations, one or more process blocks of FIG. 6 may be performed by a user device (e.g., the terminating user device 330). In some implementations, one or more process blocks of FIG. 6 may be performed by another device or a group of devices separate from or including the user device, such as a call security system (e.g., the call security system 310) and/or an originating user device (e.g., the originating user device 320). Additionally, or alternatively, one or more process blocks of FIG. 6 may be performed by one or more components of device 400, such as processor 420, memory 430, input component 440, output component 450, and/or communication component 460.

As shown in FIG. 6, process 600 may include configuring, according to a SIP update, a user interface associated with receiving calls to indicate carrier identification information associated with the calls (block 610). For example, the user device may configure, according to a SIP update, a user interface associated with receiving calls to indicate carrier identification information associated with the calls, as described above. In some implementations, the SIP invite is received from a terminating network that received, from the originating network, call information that included the SIP invite.

As further shown in FIG. 6, process 600 may include receiving a SIP invite that includes an identity header (block 620). For example, the user device may receive a SIP invite that includes an identity header, as described above. In some implementations, the SIP invite is associated with a call from an originating user device that is associated with an originating network.

As further shown in FIG. 6, process 600 may include processing, according to the SIP update, the identity header to identify a carrier identifier associated with the originating network (block 630). For example, the user device may process, according to the SIP update, the identity header to identify a carrier identifier associated with the originating network, as described above.

As further shown in FIG. 6, process 600 may include providing, via the user interface and based on the carrier identifier, an indication that specifies that the call was received from the originating network (block 640). For example, the user device may provide, via the user interface and based on the carrier identifier, an indication that specifies that the call was received from the originating network, as described above.

In some implementations, process 600 includes identifying, within the SIP invite, authentication information associated with the call. The indication may specify, according to the authentication information, that an authorized entity, associated with the originating network, authenticated a caller identification of the originating user device. In some implementations, the authentication information includes at least one of a verification status indicating that the caller identification is verified, an attestation header indicating that the caller identification is valid, or an origination identifier indicating origination information associated with the originating user device.

In some implementations, the user device may detect that the call with the originating user device ended, and request, based on detecting that the call with the originating user device ended, feedback associated with the call. In some implementations, the user device may receive the feedback and provide the feedback to a terminating network that provided the SIP invite.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a terminating security system, a session initiation protocol (SIP) invite associated with a call to a terminating user device from an originating user device,
      wherein the terminating user device is associated with a terminating network, the terminating security system is associated with the terminating network, and the originating user device is associated with an originating network,
      wherein the call is a SIP originating call and the terminating security system is a SIP network device, and
      wherein the SIP invite includes an identity header that indicates origination information associated with the originating network,
         wherein the origination information includes a carrier identifier of a service provider associated with the originating network;
   verifying, by the terminating security system, an authentication of the call based on the terminating network providing a caller identification of the originating user device and the origination information;
   generating, by the terminating security system and based on the authentication of the call being verified, authentication information that indicates that the service provider authenticated the caller identification of the originating user device; and
   sending, by the terminating security system and based on authenticating the call, the authentication information to the terminating user device to indicate, in association with receiving the call and via a user interface, that the service provider is an authorized entity.

2. The method of claim 1, wherein the authentication is verified based on a public key that is mapped to the carrier identifier,
   wherein the public key is configured to verify that the service provider is associated with the originating network and that the service provider authenticated the caller identification of the originating user device.

3. The method of claim 1, wherein the SIP invite is configured to cause the terminating user device to indicate the service provider based on the SIP invite specifying that the call is valid and that the service provider authenticated the caller identification.

4. The method of claim 1, wherein the SIP invite is received from the originating network based on the originating network authenticating the caller identification of the originating user device.

5. The method of claim 1, further comprising:
   providing, prior to sending the authentication information, a SIP update to the terminating user device,
      wherein the SIP update is configured to permit the terminating user device, in association with receiving calls, to process identity headers of corresponding SIP invites.

6. The method of claim 1, wherein the authentication information includes a verification status indicating that the caller identification is verified.

7. A terminating security system, comprising:
   one or more processors configured to:
      receive call information associated with a call to a terminating user device from an originating user device,
         wherein the terminating user device is associated with a terminating network, the terminating security system is associated with the terminating network, and the originating user device is associated with an originating network,
         wherein the call is a session initiation protocol (SIP) originating call and the terminating security system is a SIP network device, and
         wherein the call information includes origination information associated with the originating network and a caller identification,
            wherein the origination information includes a carrier identifier of a service provider associated with the originating network;
      append, to the call and based on the caller identification being verified as being associated with the originating user device, authentication information to generate an authenticated call,
         wherein the authentication information indicates that the service provider authenticated the caller identification; and
      send, to the terminating user device, the authenticated call to permit the terminating user device to indicate the carrier identifier in association with an indication that the caller identification is associated with the originating user device.

8. The terminating security system of claim 7, wherein the carrier identifier is mapped to a public key associated with verifying that the caller identification is associated with the originating user device.

9. The terminating security system of claim 7, wherein the indication specifies that the service provider authenticated the caller identification.

10. The terminating security system of claim 7, wherein the carrier identifier is included within an identity header associated with a SIP,
    wherein the terminating user device is configured to process the identity header to display the carrier identifier in association with receiving the call.

11. The terminating security system of claim 7, wherein the call information comprises a SIP invite.

12. The terminating security system of claim 7, wherein the authentication information is indicative of the terminating network authenticating the call and the originating network verifying the call.

13. The terminating security system of claim 7, wherein the authentication information includes at least one of:
   a verification status indicating that the caller identification is verified, or
   an attestation header indicating that the caller identification is valid.

14. A user device, comprising:
   one or more processors configured to:
      configure, according to a session initiation protocol (SIP) update, a user interface associated with receiving calls to indicate carrier identification information associated with the calls;
      receive, from a terminating network, a SIP invite that includes authentication information within an identity header,
         wherein the SIP invite is associated with a call from an originating user device that is associated with an originating network,
         wherein the call is a SIP originating call, and
         wherein the authentication information indicates that a service provider associated with the originating network authenticated the call;
      process, according to the SIP update, the identity header to identify a carrier identifier of the service provider,
         wherein the carrier identifier was identified by a terminating security system associated with the terminating network, and
         wherein the terminating security system is a SIP network device; and
      provide, via the user interface and based on the carrier identifier, an indication that specifies that the call was received from the originating network.

15. The user device of claim 14, wherein the terminating network received, from the originating network, call information that included the SIP invite.

16. The user device of claim 14, wherein the indication specifies, according to the authentication information, that the service provider authenticated a caller identification of the originating user device.

17. The user device of claim 16, wherein the authentication information includes at least one of:
   a verification status indicating that the caller identification is verified, or
   an attestation header indicating that the caller identification is valid.

18. The user device of claim 14, wherein the one or more processors are further configured to:
   detect that the call with the originating user device ended; and
   request, based on detecting that the call with the originating user device ending, feedback associated with the call.

19. The user device of claim 18, wherein the one or more processors are further configured to:
   receive the feedback; and
   provide the feedback to a terminating network that provided the SIP invite.

20. The method of claim 1, wherein the authentication information includes an attestation header indicating that the caller identification is valid.

* * * * *